US 7,456,582 B2

(12) United States Patent
Van Casteren

(10) Patent No.: US 7,456,582 B2
(45) Date of Patent: Nov. 25, 2008

(54) CIRCUIT AND METHOD FOR DRIVING A LOAD, IN PARTICULAR A HIGH-INTENSITY DISCHARGE LAMP, AND A CONTROL UNIT FOR SAID CIRCUIT

(75) Inventor: Dolf Henricus Jozef Van Casteren, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 467 days.

(21) Appl. No.: 10/542,908

(22) PCT Filed: Dec. 16, 2003

(86) PCT No.: PCT/IB03/06183

§ 371 (c)(1),
(2), (4) Date: Jul. 20, 2005

(87) PCT Pub. No.: WO2004/066688

PCT Pub. Date: Aug. 5, 2004

(65) Prior Publication Data

US 2006/0071611 A1  Apr. 6, 2006

(30) Foreign Application Priority Data

Jan. 23, 2003  (EP)  .................................. 03100135

(51) Int. Cl.
*H05B 37/02* (2006.01)
(52) U.S. Cl. .................................................... 315/224
(58) Field of Classification Search ................. 315/291, 315/307, 244, 224, 320, 321, 322
See application file for complete search history.

(56) References Cited

U.S. PATENT DOCUMENTS

| 5,488,269 | A  | * | 1/1996  | El-Hamamsy et al. ...... 315/307 |
| 5,546,300 | A  |   | 8/1996  | Lee et al. |
| 6,008,589 | A  | * | 12/1999 | Deng et al. ............. 315/209 R |
| 6,118,224 | A  | * | 9/2000  | Murakami et al. .......... 315/244 |
| 6,362,575 | B1 | * | 3/2002  | Chang et al. ................ 315/224 |
| 6,376,997 | B1 | * | 4/2002  | Aendekerk .................. 315/291 |

(Continued)

FOREIGN PATENT DOCUMENTS

EP  0279489  8/1988

(Continued)

*Primary Examiner*—Douglas W. Owens
*Assistant Examiner*—Minh Dieu A

(57) ABSTRACT

Circuit for driving a load, comprising: two input terminals for connection to a source of a supply voltage; a first and a second output terminal for connection to the load; at least one inductor coupled between one of the output terminals and a corresponding connection node; at least one arrangement comprising a switch coupled between one of said input terminals and one of said connection nodes, a diode being connected between said one connection node and the other input terminal; a control unit for controlling said one or more switches; wherein each arrangement and corresponding diode are designed to allow the voltage over the opened switch of said arrangement to return to substantially zero before said switch is closed, the control unit being designed to provide a signal for closing the switch when a substantially zero voltage over said opened switch is detected. Turning the switch on at a substantially zero voltage means that switching losses are greatly reduced, and this without complicating the circuit.

11 Claims, 8 Drawing Sheets

U.S. PATENT DOCUMENTS

| | | |
|---|---|---|
| 6,384,544 B1 | 5/2002 | Greenwood et al. |
| 6,437,515 B1 * | 8/2002 | Kamoi et al. ........... 315/209 R |

FOREIGN PATENT DOCUMENTS

| | | |
|---|---|---|
| EP | 0788298 A | 8/1997 |
| WO | WO 9744989 | 11/1997 |
| WO | WO 03028411 | 4/2003 |
| WO | WO 03049506 | 6/2003 |
| WO | WO 03061352 | 7/2003 |

* cited by examiner

CIRCUIT AND METHOD FOR DRIVING A LOAD, IN PARTICULAR A HIGH-INTENSITY DISCHARGE LAMP, AND A CONTROL UNIT FOR SAID CIRCUIT

The present invention relates to a circuit for driving a load, comprising:
  two input terminals for connection to a source of a supply voltage;
  a first and a second output terminal for connection to the load;
  at least one inductor coupled between one of the output terminals and a corresponding connection node;
  at least one arrangement comprising a switch coupled between one of said input terminals and one of said connection nodes, a diode being connected between said one connection node and the other input terminal;
  a control unit for controlling said at least one switch.

Such a circuit is for example known from U.S. Pat. No. 6,384,544. This document discloses a ballast for high-intensity discharge lamps, wherein the steady-state running current of the lamp may be controlled using only two power switches. The circuit is provided with current limiting means which measure the current through the lamp, and disable the current by opening the active switch when it is too high. When the current decreases, the active switch is turned on again. This feed-back mechanism turns the active switch on independently of the voltage over the switch at that time, causing switching losses to occur.

The general object of the invention is to provide a circuit for driving a load, typically a high-intensity discharge lamp, with a limited number of components and low switching losses.

This object is achieved by designing each arrangement and corresponding diode to allow the voltage over the switch of said each arrangement to return to substantially zero before said switch is closed, the control unit being designed to provide a signal for closing the switch when a substantially zero voltage is detected over said opened switch.

Turning the switch on at a substantially zero voltage means that switching losses are greatly reduced, and this without complicating the circuit. A control unit can be used to obtain this critical discontinuous current mode, which is the most efficient mode for driving a load such as a high-intensity discharge lamp.

When high-intensity discharge (HID) lamps, for instance a metal halide lamp, are operated during the steady-state operation, it is beneficial to deliver a well-defined power level to the lamp independently of the lamp voltage, and without having too many losses, such as switching losses, etc.

As HID lamps are susceptible to acoustic resonance at high frequencies, HID lamps are preferably driven at relatively low frequencies (typically 100 Hz) with a square wave current.

A preferred embodiment of the circuit of the invention for driving a load with a substantially square wave current comprises:
  a first arrangement comprising a first switch coupled between the first input terminal and one of the said connection nodes, a diode being connected between said one connection node and the second input terminal;
  a second arrangement comprising the second switch coupled between the second input terminal and one of the said connection nodes, a diode being connected between said one connection node and the first input terminal;
  the control unit being designed to generate its control signals in commutation intervals, said first switch being operated during a first interval causing a load current having substantially a first direction, and said second switch being operated during a second interval causing a load current having substantially the opposite direction.

During a first commutation interval the first switch is operated. When a first switch is conducting, an increasing current will flow from the first input terminal via the switch through the inductor. The current continues to increase until a determined condition is fulfilled (for instance when a peak current is reached), at which moment the switch is opened. At that moment the capacitor which models the internal capacitance of the switch seen in the connection node, takes over the inductor current, causing the capacitor voltage to decrease rapidly until the diode is switched on. The diode now takes over the inductor current. The inductor current decreases further and crosses zero. The diode stops conducting and the capacitor takes over the current in the reverse direction, causing the capacitor voltage to rise rapidly. When the voltage over the capacitor reaches the voltage of the first input terminal, the switch can be turned on again. In the case of an arrangement comprising only a MOSFET switch, the internal body diode of the switch M1 will conduct during a very short period just before turning the switch back on. In this way switching-on takes place when the voltage drop over the switch is substantially zero, so that the losses are minimal.

This zero voltage switching of the first switch is repeated until there occurs a commutation moment. At such a moment the first commutation interval ends, and the second commutation interval starts. During the second commutation interval the second switch is repeatedly switched on and off while the first switch is kept in its non-conducting state. It will be apparent that the same phases can be distinguished and that the current flows in the opposite direction through the lamp circuit.

The used switches are preferably MOSFET devices. IGBTs could be used as well, but have the drawback that the current losses are too high when they are switched off. MOSFETs switch off very rapidly and are therefore preferred.

According to a first embodiment of the circuit of the invention, a first inductor is coupled between an output terminal and a first connection node, and a second inductor is coupled between said output terminal and a second connection node, wherein the first switch is coupled between said first connection node and the first input terminal and the second switch are coupled between said second connection node and the second input terminal.

This embodiment with two independent down-stages is especially advantageous because the number of components is limited and because the circuit does not require any shottky diodes. Because the circuit can be operated by the control unit in the transition mode, the losses are minimal.

According to a second embodiment of the circuit of the invention, each arrangement comprises a series connection of the switch with two diodes coupled in anti-parallel, which first and second arrangement are coupled between the respective input terminals and a common connection node connected to one side of the inductor.

This is a variant with one down-stage which can be operated under substantially the same conditions as the already described embodiments.

According to a further aspect of the invention the control unit is designed to generate a commutation control signal for controlling the commutation intervals and a switching signal having a higher frequency than said commutation control signal for controlling the operation of the active switch, wherein said commutation and said switching signal are synchronized by the control unit.

This synchronization ensures a well-defined commutation moment and avoids unexpected current or voltage behavior in the circuit.

According to a first variant of the invention the commutation control signal ensures a commutation from said first interval to said second interval when the current through the one or more inductors is substantially zero.

Apart from the switching losses during the first interval when the first switch is operated, and during the second interval when the second switch is operated, commutation losses when switching from the first to the second interval can also be taken into account, although they are usually less important. However the commutating switching losses can also be minimized by synchronizing the high-frequency switching action with the low-frequency switching action, wherein the roles of the switches can be interchanged during zero current.

According to a second variant the commutation control signal ensures a commutation from said first interval to said second interval when the current through the at least one inductor is substantially maximum.

In the second embodiment of the invention, which will be further described in FIG. 9, the commutation at maximum current, corresponds with a substantially zero voltage over the switch which is going to become active, and can also be advantageous.

The invention further relates to a method for driving a load, comprising the steps of:

turning on a switch for providing current through an inductor to the load;

turning off said switch when the current through the inductor reaches a determined value.

The method of the invention is distinguished in that, after turn-off of the switch, the current is directed so that it continues to flow until the voltage over the switch is substantially zero, at which time the switch is turned on again.

In this way switching losses are greatly reduced.

The invention also relates to a control unit for use in any of the above described embodiments of the circuit or the method of the invention, wherein said control unit comprises:

two capacitors coupled in series between one input terminal and one of the connection nodes, wherein the divider node between the two capacitors is coupled via a resistor to a logic circuit;

said logic circuit being designed to provide a signal which turns on the corresponding switch connected to said connection node when the voltage in the divider node falls within a predetermined voltage range.

Such a control unit can be used in the circuit or the method of the invention so as to ensure that closing of the switch takes place at a substantially zero voltage over this switch.

According to a first variant, the logic circuit further comprises a timer which starts running when the active switch is turned on until a pre-set time period has elapsed and the logic circuit provides a signal for turning off the switch.

According to another variant, the logic circuit further comprises means for detecting a peak current in the load (4), wherein the logic circuit provides a signal for turning off the switch (M1;M2) when said peak current is detected.

These and other aspects of the present invention will become apparent from and be elucidated with reference to the illustrative embodiments described hereinafter by way of non-limiting indication, and on the basis of the attached drawings, in which.

Figure 1:
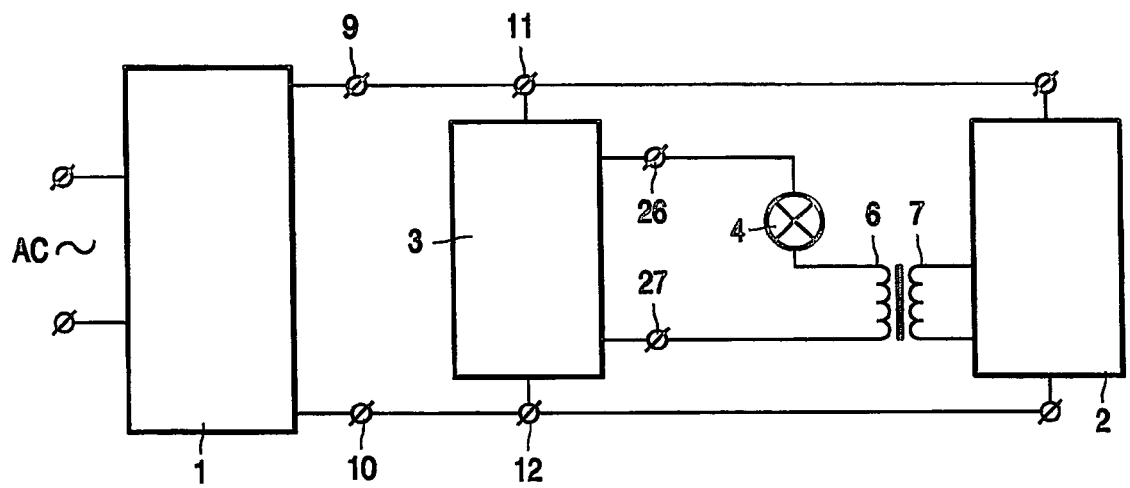
FIG. 1 is a schematic circuit block diagram of a prior art ballast.

FIG. 1 shows a ballast circuit which is suitable for both igniting and operating an HID lamp 4. A first circuitry block 1, typically comprising a rectifier and an up-converter, converts an AC input voltage into a high DC output voltage, typically in the order of 500 V. This high DC voltage is provided between two output terminals 9, 10 of block 1 and used as the supply voltage for respectively the igniter circuit 2 and the forward commutating stage 3 fulfilling the function of a down-converter and a commutator into one integrated stage.

The igniter circuit 2 causes a current peak in the primary winding 7 in order to generate a high voltage peak at the secondary winding 6.

The commutating-forward stage 3 provides a square wave current to operate the lamp during the run-up phase of the lamp and in steady state.

The following discussion concerns commutating-forward stages using a half-bridge configuration, but a person skilled in the art will understand that the explanation below can also be applied to a commutating-forward stage 3 using a full-bridge configuration.

Figure 2:
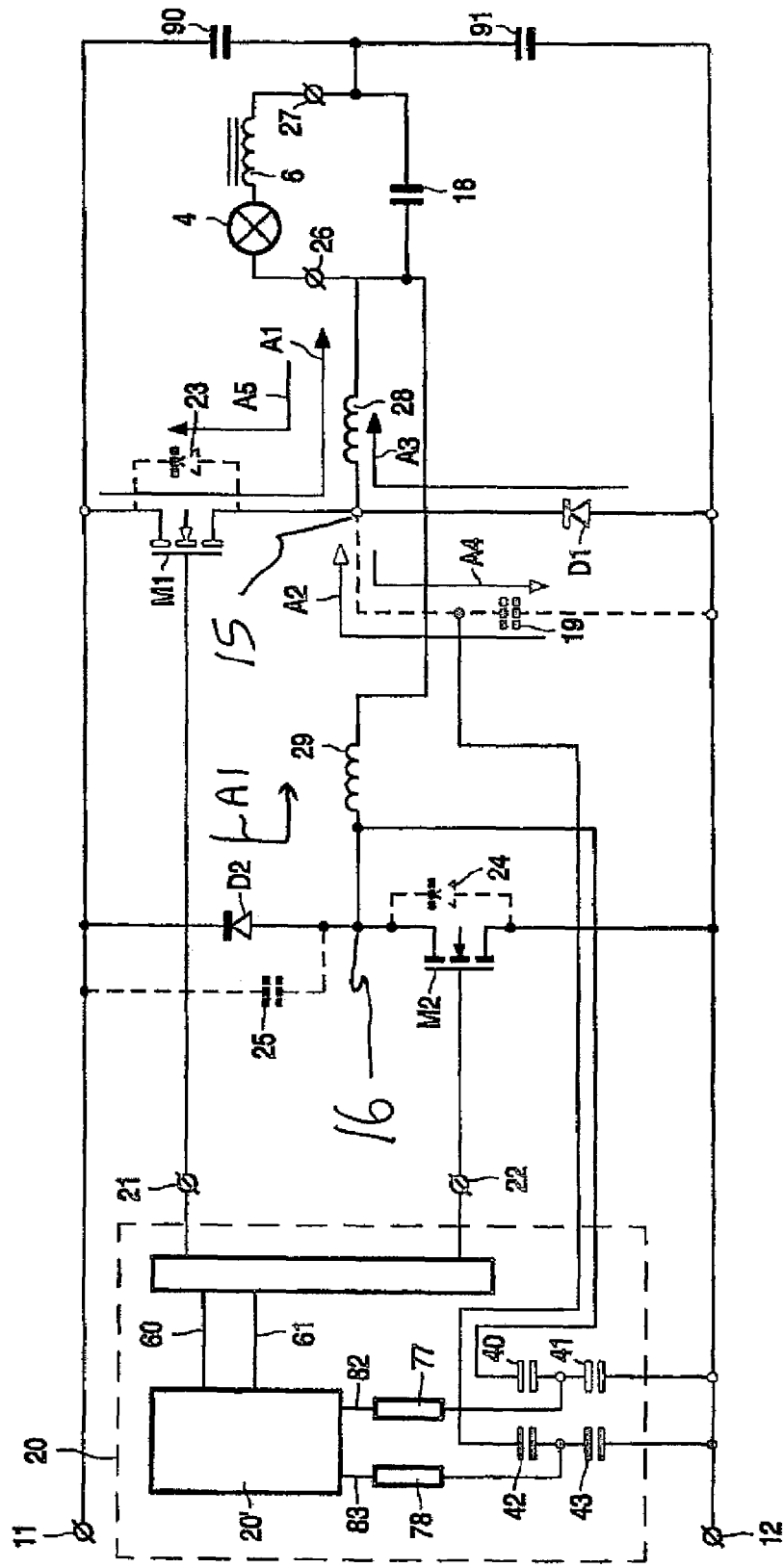
FIG. 2 is schematic circuit diagram of a first embodiment of a commutating-forward driver circuit according to the invention.

FIG. 2 shows a commutating-forward driver 3 according to a first embodiment of the invention, which can be used to perform the method of the invention. The driver has two input terminals 11, 12 for connection to the output terminals 9, 10 of the first block 1.

A first MOSFET switch M1 has its drain and source terminals connected to respectively the first input terminal 11 and connection node 15. A first fast recovery diode D1 is connected between connection node 15 and input terminal 12, so that it forms a series connection to the first MOSFET M1. A second MOSFET switch M2 has its source and drain terminals connected to respectively the second input terminal 12 and connection node 16. A second fast recovery diode D2 is connected between connection node 16 and the first input terminal 11, so that it forms a series connection to the second MOSFET M2.

The respective connection nodes 15, 16 are connected to separate inductors 28 and 29, which are both connected to a first output terminal 26. One side of the lamp 4 is connected to the output terminal 26. A filter capacitor 18 is placed in parallel with the lamp 4. The transformer 6, 7 and said capacitor 18 serve to smoothen the current through the lamp 4.

The driver 3 further comprises a control unit 20 having at least two output terminals 21, 22 which are connected to the respective gates of the two MOSFETs M1, and M2. The control unit 20 is designed to open and close the MOSFET switches M1, M2 by supplying the gate of these devices with a control signal S1, S2. The control unit 20 typically comprises an arrangement for detecting the voltage between connection nodes 15, 16 and the input terminal 12, a logic circuit 20' and a level shifter circuit 59. When the detection arrangement detects a substantially zero voltage over the active opened switch (M1 or M2), a signal for closing the corresponding switch is produced via the logic circuit 20' and the level shifter circuit 59. The level shifter 59 has the main task of raising the "1" output of the logic circuit 20' to a suitable voltage to switch on M1 or M2.

The detection arrangement comprises a first capacitive divider 42, 43 coupled between one input terminal 12 and the first connection node 15, wherein the divider node 82 between the two capacitors 42, 43 is coupled via a resistor 78 to a logic circuit 20. This first divider is used to determine when the voltage over the first switch is substantially zero. The detection arrangement further comprises a second arrangement 40, 41 for determining when the voltage over the second switch is substantially zero.

The logic circuit 20' is designed to provide a signal which turns on the corresponding switch when the voltage in the divider node falls within a predetermined voltage range.

Suitable values for the various components of the driver circuit designed for driving an HID lamp, typically a metal halide lamp, are as follows: M1 en M2, 7B60C, inductor 28, 29, 300 :H, diode D1 and D2, MUR160, capacitor 40, 42, 33 pF, capacitor 41, 43, 330 pF.

It will be appreciated that the values given above for the various components of the circuit are merely illustrative, and that other values and designs are also suitable based on the particular criteria and preferences of the circuit designer.

The typical behavior of this commutating-forward driver circuit will now be described with reference to the voltage and current waveforms shown in FIG. 3.

Figure 3:
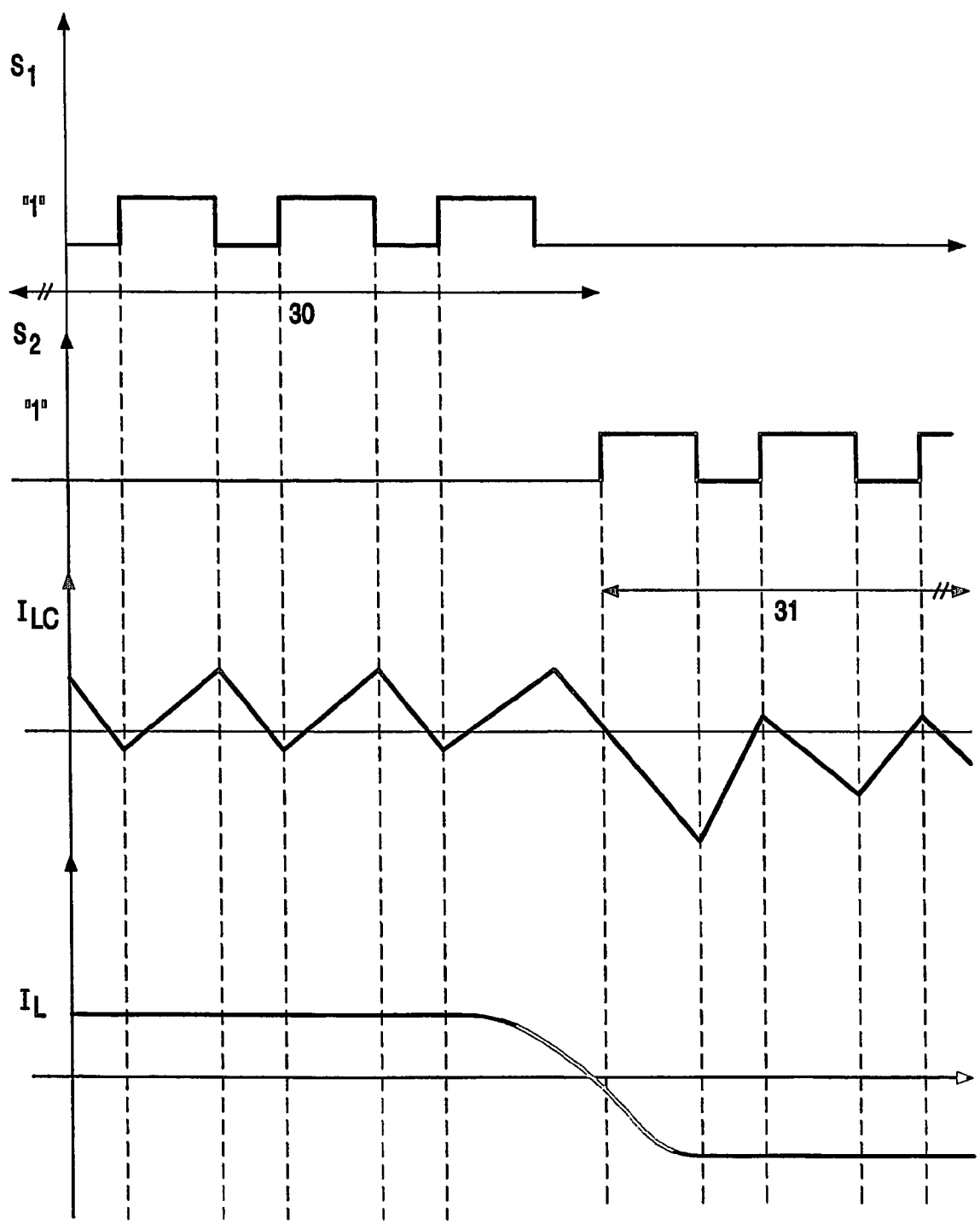
FIG. 3 represents schematically the current and/or voltage waveforms at various points of the circuit of FIG. 2.

A signal S1, S2 causing a corresponding switch to close will be indicated in FIG. 3 as a logical value "1", whereas a signal S1, S2 causing a corresponding switch to open will be indicated as a logical "0". The sum of the current through the respective inductors 28 and 29 will be referred to as the lamp circuit current $I_{LC}$, while the current through the lamp is referred to as $I_L$.

During a first commutation interval 30, five main operational phases can be distinguished, these being indicated in FIG. 2 with the arrows A1-A5. When the signal S1 is such that MOSFET M1 is conducting, i.e. S1="1", an increasing current will flow from input terminal 11 via MOSFET M1 through inductor L1, as indicated with the arrow A1. The current continues to increase until a peak current Ip is reached and M1 is switched off by setting signal S1 to "0". At that moment the parallel capacitor 19, which models the internal capacitance as seen in node 15, takes over the inductor current as indicated with arrow A2, causing the capacitor voltage to decrease rapidly until the diode D1 is switched on. Diode D1 now takes over the inductor current as shown with arrow A3. The inductor current $I_{LC}$ decreases further and crosses zero. Diode D1 stops conducting and the parallel capacitor 19 takes over the current in the reverse direction, causing the capacitor voltage to rise rapidly. When the voltage over the parallel capacitor 19 reaches the voltage of the first input terminal 11, the internal body diode 23 of the MOSFET M1 will conduct during a very short period, as shown by arrow A5, and T1 can be switched on again by applying a signal S1="1". In this way turning on the switch takes place when the voltage drop over the MOSFET M1 is substantially zero or, in other words, a zero-voltage switching has been performed according to the method of the present invention. Phase 1 will now start again.

This zero-voltage switching of the first MOSFET M1 is repeated until a commutation moment. At such a moment the first commutation interval 30 ends, and the second commutation interval 31 starts. During the second commutation interval 31 the second MOSFET M2 is repeatedly switched on and off, while the first MOSFET M1 is held in its non-conducting state. It will be apparent that the same five phases can be distinguished and that the current flows in the opposite direction through the lamp circuit.

Figure 4:
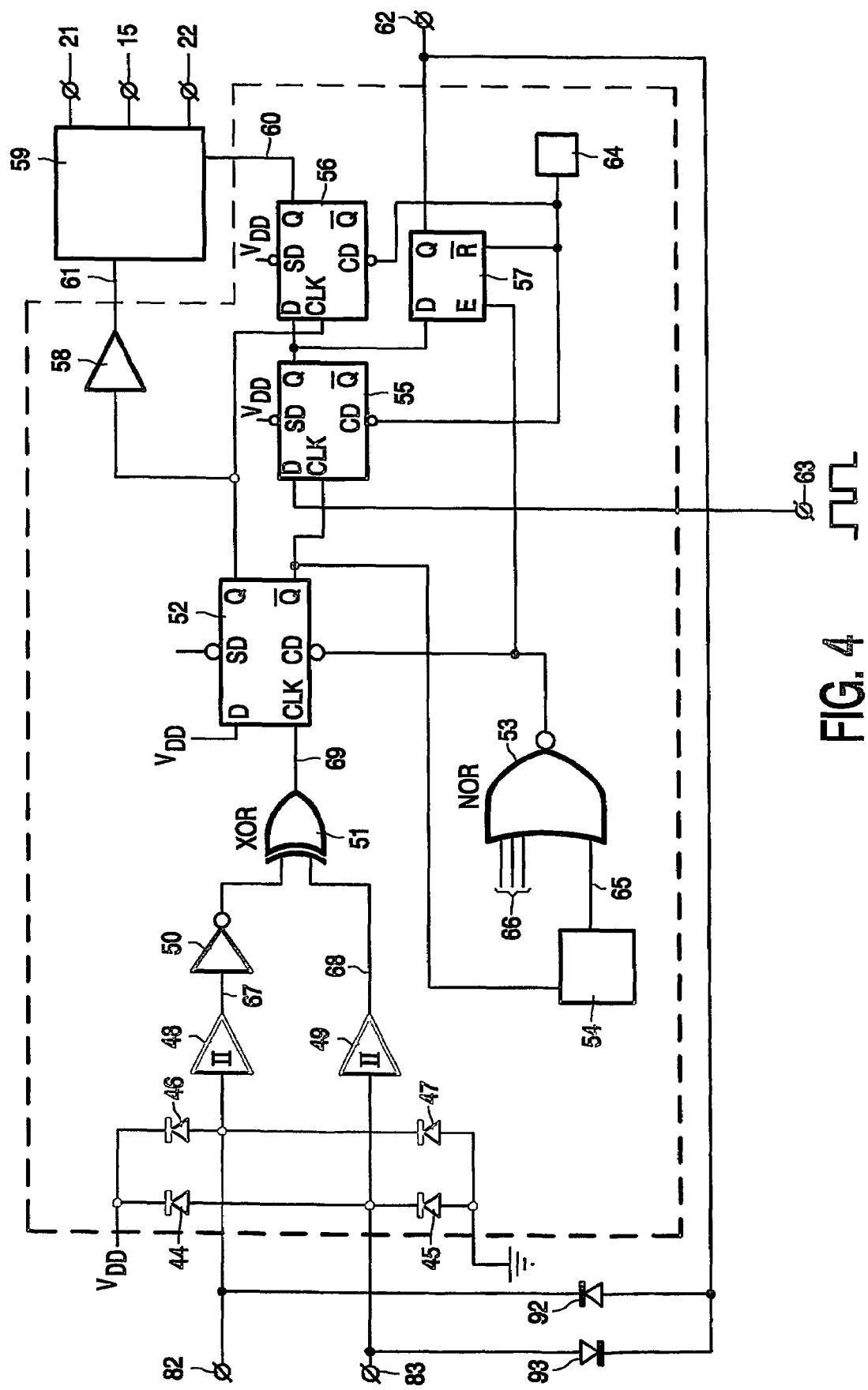
FIG. 4 shows a preferred embodiment of the control unit for use with the circuit of FIG. 2 according to the invention.

FIG. 4 illustrates the logic circuit 20' of a control unit 20 according to the invention. The capacitive dividers 40, 41 and 42, 43 are connected to the input pins 82 and 83 of the logic circuit 20'. These voltage levels are transferred to logic Voltage levels via two Schmitt triggers 48, 49. One trigger output 67 corresponding with the voltage in connection node 16 is inverted with inverter 50, so that this output is high when a zero voltage is detected. On the assumption that the circuit is operated in the second commutation interval, and hence switch M1 is permanently open (thus output 68 is low), the output 69 of the XOR 51 switches from low to high when a zero voltage is detected. This causes a rising edge at the entrance of the master flip-flop 52, so that the output Q of the master flip-flop 52 is high, and hence the output pin 61 of the driver 58 is high as well. This output pin is connected to a level shifter circuit 59 for switching on the switch which is being operated, which is determined by output pin 60 of the logic circuit 20'.

For the sake of clarity the truth table of the flip-flops 52, 55 and 56 is given below:

| Inputs | | | | Outputs | | |
|---|---|---|---|---|---|---|
| CD | SD | D | CLK | Q | Not Q | |
| L | H | X | X | L | H | Clear |
| H | L | X | X | H | L | Preset |
| L | L | X | X | L | L | |
| H | L | L | L->H | L | H | |
| H | H | H | L->H | H | L | |
| H | H | X | H->L | Qn | Not Qn | |

The low frequency signal, typically a 100 Hz square wave signal, is provided at input pin 63. This signal is synchronized with the high-frequency signal at the output of flip-flop 52 by means of two subsequent flip-flops 55 and 56.

This synchronized signal is used to determine the commutation time of the driver circuit of the lamp.

Flip-flop 55 is coupled with the output "not Q" of the master flip-flop 52 to trigger the flip-flop 55 on a master reset. The Q output of flip-flop 55 is connected with a latch 57 for providing an output signal in output pin 62.

Output pin 62 is connected via a first diode 92 with input pin 82, and via a second diode 93 with input pin 83. These diodes 92, 93 ensure that input pin 82 is maintained high when switch M1 is active (first commutation interval), and that input pin 83 is maintained low when switch M2 is active (second commutation interval).

The turn-on time of the switches can be determined by different conditions. The logic circuit comprises a timer 54 which starts running after a zero-voltage detection (switch is turned on), which timer 54 has an output which becomes high when a pre-set time T has elapsed. This causes a low value (via the NOR element 53) at the CD pin of the flip-flop 52, which brings the output Q of said flip-flop 52 to low state and turns off the switch. Other inputs can be coupled to the NOR element 53 in order to turn off the switch. For example, a signal which rises when a peak current or an over-voltage is detected.

Figure 5:
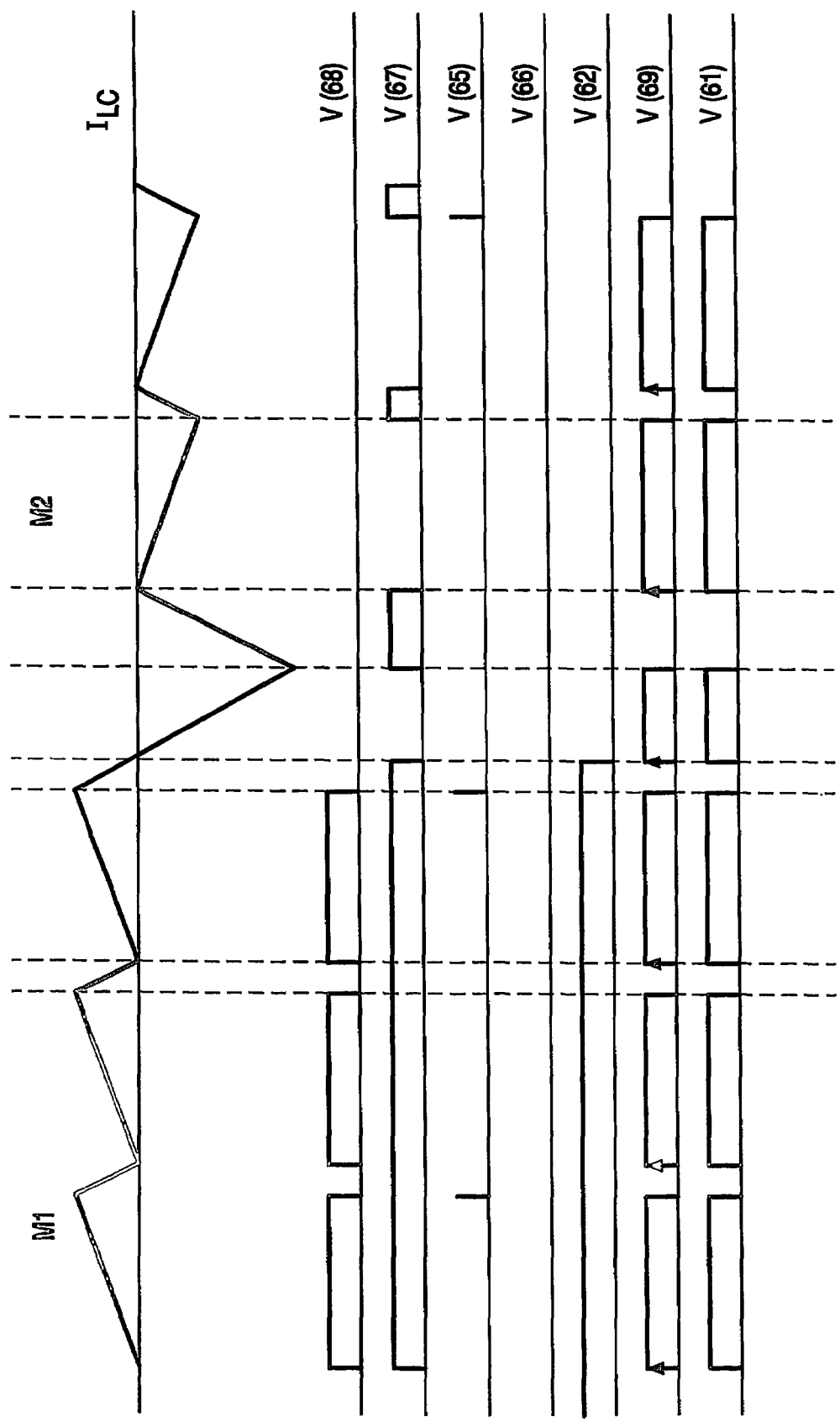
FIG. 5 shows signals at various points of the control circuit of FIG. 4 during operation of the circuit.

FIG. 5 shows the signals at various points of the logic circuit 20', and further illustrates the above explained behavior of the control unit 20. Note that the commutation moment is synchronized with the control signal in node 61 (V61) for the active switch, and that commutation occurs when the current ($I_{CL}$) is substantially zero.

Figure 6:
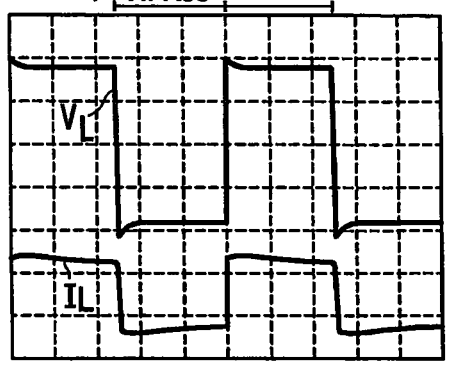
FIG. 6 is a waveform diagram showing the current through the lamp $I_L$ and the voltage over the lamp $V_L$, when the circuits of FIGS. 2 and 4 are used.

FIG. 6 shows the current through the lamp $I_L$ and the voltage over the lamp $V_L$, when the circuits of FIGS. 2 and 4 are used. The power of the lamp was 73 Watt. The scale of the y-axis is respectively 50 V/major division for $V_L$, and 1 A/major division for $I_L$, while time is shown along the X-axis in 500 :s/major division.

Figure 7:
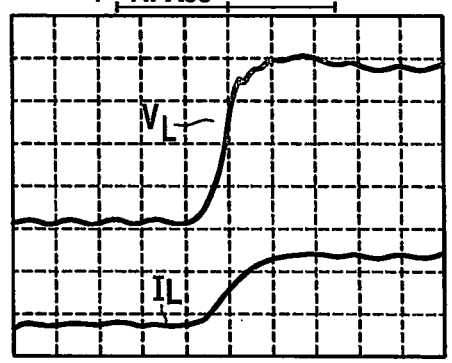
FIG. 7 shows a detail view of the voltage and current waveforms of FIG. 6 during commutation.

FIG. 7 shows a detail view of the voltage and current waveforms of FIG. 6 during commutation. The scale of the y-axis is respectively 50 V/major division for $V_L$, and 1 A/major division for $I_L$, while time is shown along the X-axis in 10 :s/major division. The commutation time is largely determined by the values of the capacitors and inductors used in the circuit.

Figure 8:
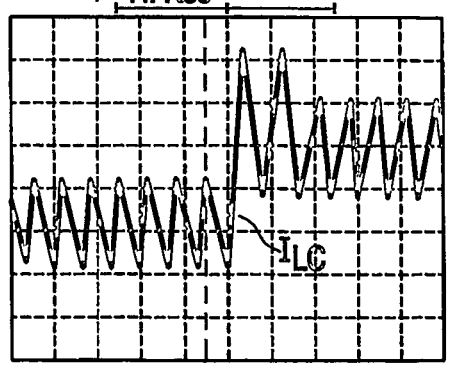
FIG. 8 is a waveform diagram showing the lamp circuit current $I_{LC}$ being the sum of the currents through the respective inductors L1 and L2, when the circuits of FIG. 2 and 4 are used.

FIG. 8 is a waveform diagram showing the lamp circuit current $I_{LC}$ being the sum of the currents through the respective inductors 28 and 29, when the circuits of FIGS. 2 and 4 are used, and for a lamp power of 73 Watt. The scale of the y-axis is 1 A/major division for $I_{LC}$, while time is shown along the X-axis in 10 :s/major division The current peaks just after commutation are typically detected by peak current detection means (not shown in FIGS. 2 and 4) providing the NOR element 53 with a high input, and hence clearing the master flip-flop 52, in order to switch off the active switch.

Figure 9:
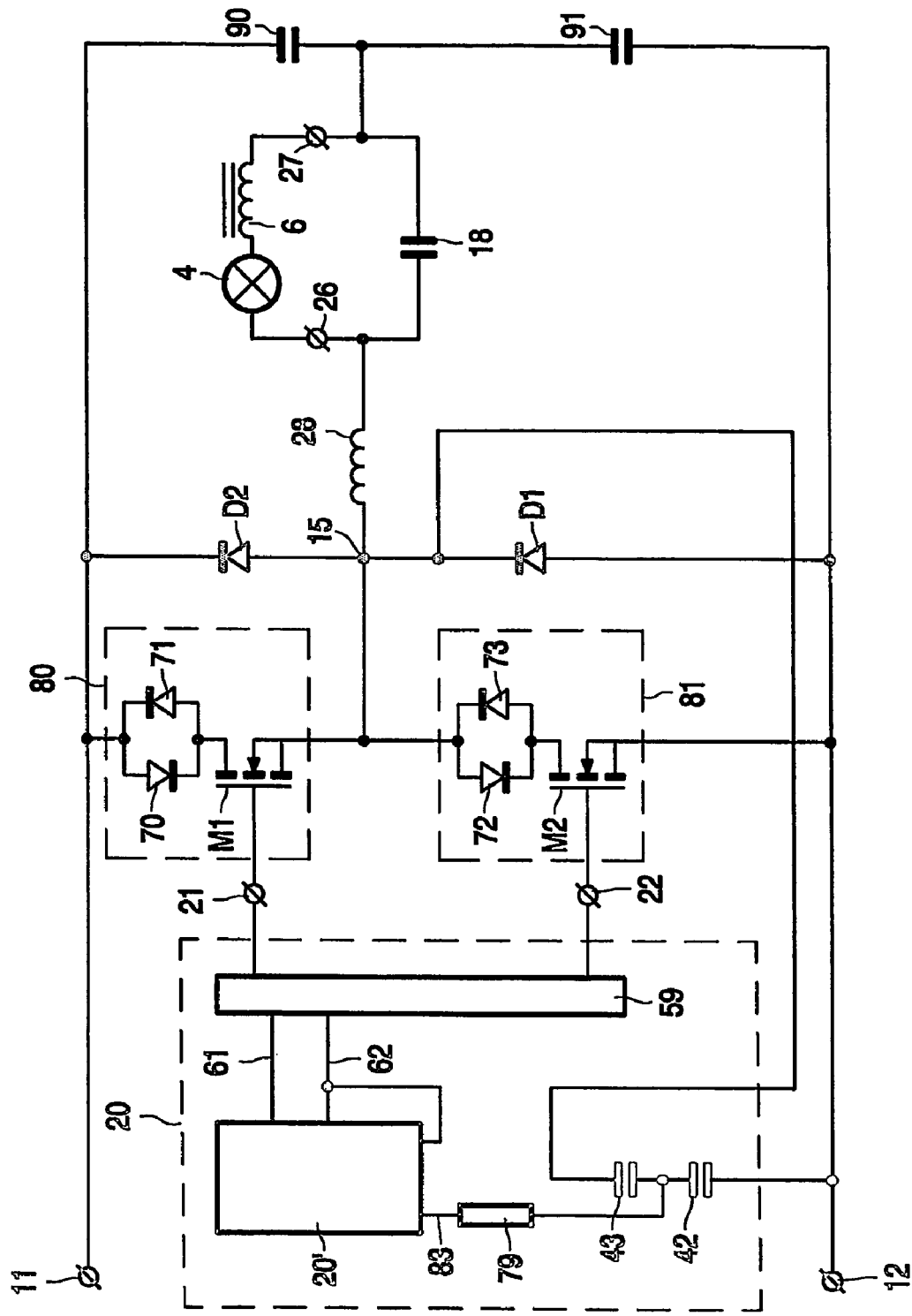
FIG. 9 shows a second embodiment of a commutating-forward driver circuit according to the invention.

FIG. 9 represents a second embodiment of the circuit according to the invention. In this circuit a first arrangement 80 coupled between input terminal 11 and connection node 15 comprises a series connection of a switch M1 with two diodes coupled in anti-parallel 70,71. A second similar arrangement 81 is coupled between the input terminals 12 and the common connection node 15 connected to one side of a single inductor 28. The operating principles are similar to those described above and will not be repeated here.

Figure 10:
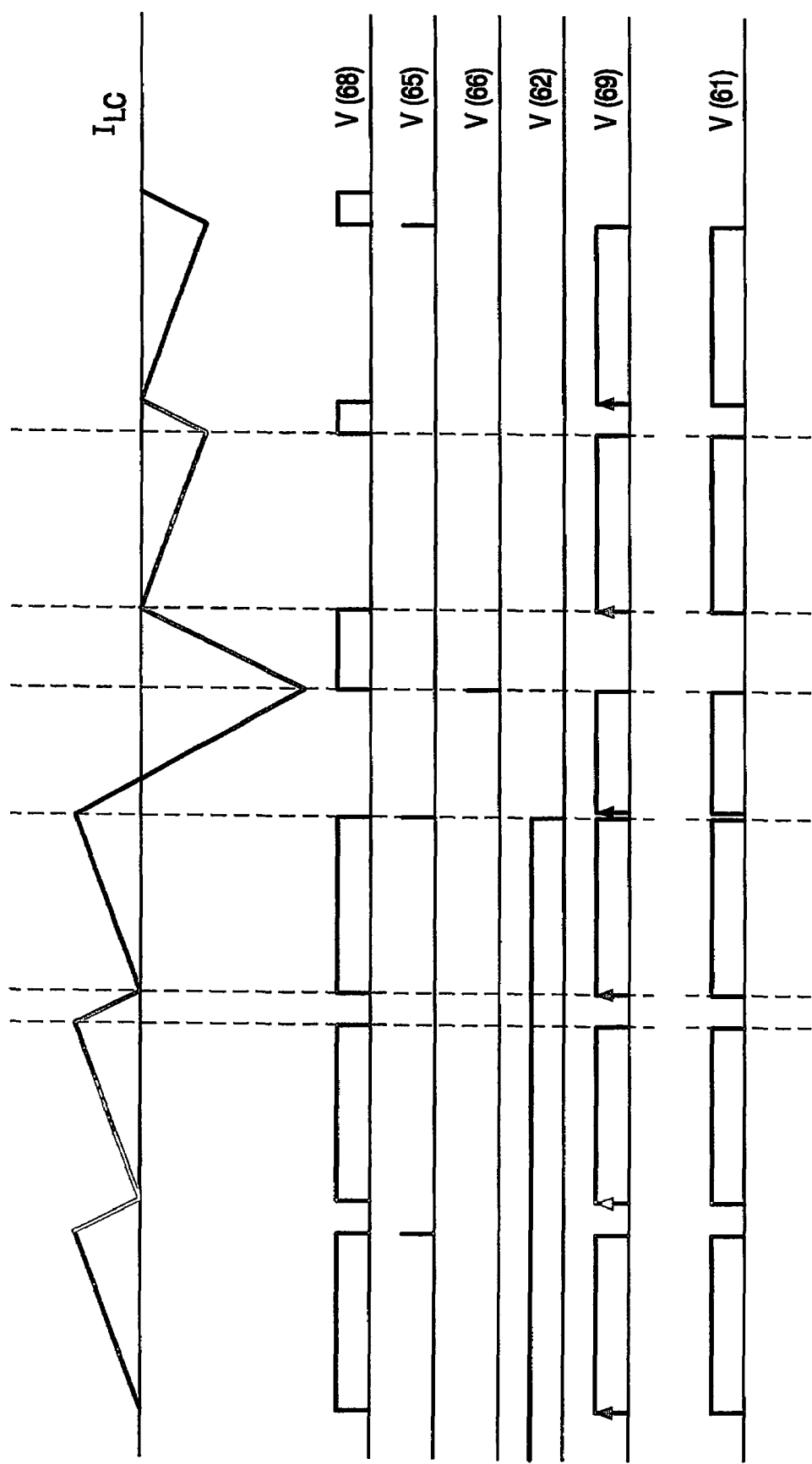
FIG. 10 shows signals at various points of the control circuit of FIG. 4 when said control circuit is used to control the second embodiment shown in FIG. 9, and when it is connected as described.

The logic circuit 20' described in FIG. 4 can also be used to control the circuit of FIG. 9. The connections are different however; output pin 60 is not used, whereas output pin 62 now provides the synchronized commutation signals. Furthermore only one capacitive divider is used and output pin 62 is not connected via diodes to the input pins 82, 83, but is connected to the level shifter and to the input pin 82 of the logic circuit 20'. In this way a different synchronization is obtained during commutation, as can be seen in FIG. 10. Here, the role of the MOSFET switches M1, M2 is changed when the current through the inductor 28 is maximum. Note however that the voltage over the switch which is going to become active is substantially zero at that time.

The invention is not limited by the above illustrated preferred embodiments, many modifications of which can be envisaged. The scope and spirit of the invention is set forth in the following claims.

The invention claimed is:

1. A circuit for driving a load, comprising:
   two input terminals for connection to a source of a supply voltage;
   a first output terminal and a second output terminal for connection to the load;
   at least one inductor coupled between one of the output terminals and a corresponding connection node;
   at least one arrangement comprising a switch coupled between one of said input terminals and one of said connection nodes, a diode being connected between said one connection node and the other input terminal;
   a control unit for controlling said switch;
   wherein said at least one arrangement and a corresponding diode are designed to allow the voltage over an opened switch of said at least one arrangement to return to substantially zero before said opened switch is closed, the control unit being designed to provide a signal for closing the opened switch when a substantially zero voltage over said opened switch is detected.

2. The circuit according to claim 1, wherein said switches are MOSFET switches.

3. A circuit for driving a load with a substantially square wave current, comprising:
   a first input terminal and a second input for connection to a source of a supply voltage;
   a first output terminal and a second output terminal for connection to the load;
   at least one inductor coupled between one of the first output terminal and the second output terminal and a corresponding connection node;
   a first arrangement comprising a first switch coupled between the first input terminal a first connection node, and a first diode connected between said first connection node and the second input terminal;
   a second arrangement comprising a second switch coupled between the second input terminal and a second connection node, and a second diode connected between said second connection node and the first input terminal; and
   a control unit for controlling said first switch and said second switch;
   wherein said first arrangement and said second arrangement are designed to allow a voltage over an opened switch of said first arrangement and said second arrangement to return to substantially zero before said opened switch is closed, the control unit being designed to provide a signal for closing the opened switch when a substantially zero voltage over said opened switch is detected; and
   wherein the control unit is further designed to generate control signals in commutation intervals, said first switch being operated during a first interval causing a load current having substantially a first direction, and said second switch being operated during a second interval causing a load current having substantially a second direction which is opposite the first direction.

4. The circuit according to claim 3, wherein a first inductor is coupled between said first output terminal and said first connection node, and a second inductor is coupled between said first output terminal and said second connection node, and wherein the first switch is coupled between said first connection node and the first input terminal and the second switch is coupled between said second connection node and the second input terminal.

5. The circuit according to claim 3, wherein the first arrangement and the second arrangement each comprises a series connection of a switch with two diodes coupled in anti-parallel, and wherein the first arrangement and the second arrangement are coupled between respective input terminals and a common connection node connected to one side of the inductor.

6. The circuit according to claim 3, wherein the control unit is further designed to generate a commutation control signal for controlling the commutation intervals and a switching signal having a higher frequency than said commutation control signal for controlling operation of an active switch, wherein said commutation and said switching signal are synchronized by the control unit.

7. The circuit according to claim 6, wherein the commutation control signal ensures a commutation from said first interval to said second interval when a current through the at least one inductor is substantially zero.

8. The circuit according to claim 6, wherein the commutation control signal ensures a commutation from said first interval to said second interval when a current through the at least one inductor is substantially maximum.

9. A control unit for use in a circuit for driving a load, the circuit comprising:
   two input terminals for connection to a source of a supply voltage;
   a first output terminal and a second output terminal for connection to the load;
   at least one inductor coupled between one of the output terminals and a corresponding connection node;
   at least one arrangement comprising a switch coupled between one of said input terminals and one of said connection nodes, a diode being connected between said one connection node and the other input terminal;
   a control unit for controlling said switch;
   wherein said at least one arrangement and a corresponding diode are designed to allow the voltage over an opened switch of said at least one arrangement to return to substantially zero before said opened switch is closed, the control unit being designed to provide a signal for closing the opened switch when a substantially zero voltage over said opened switch is detected;
   wherein said control unit comprises:
      two capacitors coupled in series between one input terminal and one of the connection nodes, wherein a divider node between the two capacitors is coupled via a resistor to a logic circuit;
      said logic circuit being designed to provide a signal which turns on the switch when a voltage in the divider node falls within a predetermined voltage range.

10. The control unit according to claim 9, wherein said logic circuit further comprises a timer which starts running when the active switch is turned on until a pre-set time period has elapsed, wherein the logic circuit provides a signal for turning off the switch when this pre-set time period has elapsed.

11. unit according to claim 9, wherein said logic circuit further comprises means for detecting a peak current in the load, wherein the logic circuit provides a signal for turning off the switch when said peak current is detected.

* * * * *